United States Patent [19]

Wegner

[11] 4,363,882
[45] * Dec. 14, 1982

[54] METHOD FOR PRODUCING FLAME RETARDANT FLEXIBLE POLYURETHANE FOAMS WITH BLENDS OF DIBROMONEOPENTYL GLYCOL AND FLAME RETARDANT PLASTICIZER

[75] Inventor: Gunter H. Wegner, Charlotte, N.C.

[73] Assignee: Reeves Brothers, Inc., New York, N.Y.

[*] Notice: The portion of the term of this patent subsequent to Jun. 23, 1998, has been disclaimed.

[21] Appl. No.: 275,584

[22] Filed: Jun. 19, 1981

Related U.S. Application Data

[63] Continuation-in-part of Ser. No. 29,340, Apr. 12, 1979, Pat. No. 4,275,171.

[51] Int. Cl.$^3$ ............................................. C08G 18/14
[52] U.S. Cl. .................................... 521/107; 521/108; 521/171
[58] Field of Search ........................ 521/107, 108, 171

[56] References Cited

U.S. PATENT DOCUMENTS 3,933,693  1/1976  Priest et al. .......................... 521/160
4,052,346  10/1977 Rudner et al. ....................... 521/121
4,194,068  3/1980  Miller et al. ......................... 521/108

OTHER PUBLICATIONS

Miller, "Neopentyl Bromide Based Flame Retardants for Urethane Foams," Presented at 24th Annual Technical Conference, SPI Urethane Division, Dow Chemical, USA, Oct. 26, 1978.

Primary Examiner—Maurice J. Welsh
Attorney, Agent, or Firm—Pennie & Edmonds

[57] ABSTRACT

This invention is directed to a process for producing flame retardant flexible polyurethane foams having a porosity generally in the range between 0.5 and 10 cubic feet per minute. A polyol having an average molecular weight between about 250 and about 6,500, preferably about 3,500 to 6,500, is reacted with a polyisocyanate, such as toluene diisocyanate, which comprises a mixture of 2,4- and 2,6-toluene diisocyanate isomers. The formulation of the present invention includes a flame retardant mixture of a plasticizer and dibromoneopentyl glycol. The plasticizer is either a halogented phosphonate or halogenated phosphate ester. Chlorine is the preferred halogen atom. The weight ratio of those ingredients is between about 20/80 and about 90/10. The concentration of that mixture is in excess of about 20 to about 60 percent by weight of the polyol. Other ingredients that can be included in this formulation are water, a silicone surfactant, a tertiary amine catalyst, a tertiary amine co-catalyst, an auxiliary blowing agent and a tin catalyst. This process results in foam products that are flame retardant, suitable for automotive and furniture applications, and have low flame spread indices according to the Radiant Panel Test ASTM E 162-78.

17 Claims, No Drawings

METHOD FOR PRODUCING FLAME RETARDANT FLEXIBLE POLYURETHANE FOAMS WITH BLENDS OF DIBROMONEOPENTYL GLYCOL AND FLAME RETARDANT PLASTICIZER

CROSS REFERENCE TO PARENT APPLICATION

This application is a continuation-in-part of application Ser. No. 29,340 filed Apr. 12, 1979 and naming as the inventor Gunter H. Wegner and issued as U.S. Pat. No. 4,275,171 on June 23, 1981.

TECHNICAL FIELD

This invention is directed to production of flexible polyurethane foams by a process involving the reaction of polyisocyanate with polyol or polyol blends in the presence of other ingredients such as blowing agents, silicone surfactants and accelerating agents. Specifically, this invention provides an improved method for flame retarding polyurethane foams by incorporating a mixture of dibromoneopentyl glycol (DBNG) or its esters and a non-reactive organic additive which acts as a flame retardant plasticizer when dissolved or dispersed into a foam matrix. These foams are suitable for automotive and furniture applications and particularly in applications such as prisons, institutions, public transit, theaters, high-rise buildings and airplanes.

BACKGROUND ART

Flexible polyurethane foams made from toluene diisocyanate (TDI) and polyester or polyether polyols, comprise a significant portion of the polyurethane foam industry. Because those foams are combustible, burn uncontrollably after ignition, there have been extensive efforts in that industry to produce foams that are flame retardant.

Open-cell flexible polyurethane foams are more difficult to flame-proof than closed-cell, rigid foams, because open-cell foams allow oxygen to be transferred through it to the location where the foam has been ignited. Also, such foams permit volatilized flame retardant to escape.

Many different methods have been taught in the prior art for flame retarding flexible polyurethane foams. Most of these methods involve addition to the foam reactants of a flame retardant prior to or during the polymerization reaction so that the flame retardant is uniformly distributed throughout the foam. A detailed discussion of that prior art is found in U.S. Pat. No. 3,933,693 to David C. Priest and John E. Brandien and in U.S. Pat. No. 4,194,068 to Denis P. Miller and Masachico Tamaki.

The Priest patent was directed to an improvement over the prior art. Specifically, Priest and Brandien discovered a method to incorporate DBNG in flexible polyether polyurethane foam systems without obtaining closed-cell structures. Prior art attempts to incorporate that glycol resulted in foams having closed-cell structures and physical properties unsuitable for many uses. However, this improvement over the prior art was restricted to foams made from TDI containing no more than about 76 percent by weight of the 2,4-toluene diisocyanate isomer. Priest and Brandien were unable to use higher concentrations of that isomer probably because use of DBNG in polyurethane foam systems, without a flame retardant plasticizer, contained an inherent problem with the inability of the foamer to obtain high porosity foam using higher concentrations of that isomer.

The Miller patent was also directed to an improvement over the prior art. Specifically, Miller and Tamaki discovered a method of incorporating a three-component flame retardant mixture of a bromohydrin of pentaerythritol, a polyhydric alcohol or polyol and an organophosphorous compound in polyurethane foam systems. In that regard, see particularly the description of the invention therein under the heading "Summary of the Invention" at column 3, lines 29 to 54 and column 4, lines 1 through 21.

DISCLOSURE OF INVENTION

This invention is directed to a process for producing open-celled flame retardant flexible polyurethane foams from polyester or polyether polyols and polyisocyanates, particularly TDI, which generally have a porosity between about 0.5 and about 10 cubic feet per minute. The polyol and polyisocyanate formulation includes a mixture of flame retardant plasticizer and DBNG. The combination of this plasticizer and DBNG results in a synergistic system that is substantially more efficient than the plasticizer without DBNG. The plasticizer can be a halogenated phosphonate or halogenated phosphate ester. A preferable range of weight ratios for those ingredients is about 85/15 to 50/50; a preferable concentration for the mixture is in excess of about 20 to about 50 percent by weight of the polyol. A process utilizing a formulation containing these ingredients results in a product having physical properties suitable for the automotive and furniture industries and other applications in which highly flame retardant flexible polyurethane foams are required, such as prisons, institutions, public transit, theaters, high-rise buildings and aircraft. These foams comply with small open flame tests, including MVSS-302, California Bulletin 117, Underwriter Laboratories, Inc. Horizontal Flame Test 94 and the UFAC Cigarette Smoldering Test; more significantly, these foams also exhibit low flame spread indices, i.e. less than 125 and, in many instances less than 25, according to the Radiant Panel Test ASTM E 162-78.

The subject invention also comprises an improvement in processes for producing flexible polyurethane foams, which generally have porosities in the range from about 0.5 to about 10 cubic feet per minute, in which a mixture of 2,4- and 2,6-toluene diisocyanate isomers is reacted with a polyester or polyether polyol or blends thereof in the presence of a blowing agent, such as water or a low boiling chemical like fluorocarbon or methylene chloride, silicone surfactant and accelerating agents such as amine and tin catalysts. A mixture of DBNG and a flame retardant plasticizer in an amount in excess of about 20 to about 60 percent by weight of the polyol in the polymerization reaction is incorporated into the reaction mixture prior to polymerization. A flame retardant polyurethane foam is produced.

BEST MODE FOR CARRYING OUT THE INVENTION

Generally, a conventional reaction takes place in the subject process. The reaction conditions such as temperature, pressure and order of addition are not critical, and well-known in the prior art.

Of course, the present process includes the reaction of a polyisocyanate, particularly TDI, with a polyether or a polyester polyol. Included in that reaction is a mixture of DBNG and a flame retardant plasticizer. Other conventional ingredients can be included such as water, silicone surfactant, tertiary amine catalyst or co-catalyst, auxiliary blowing agent and a tin catalyst, if the polyether comprises the polyol. A typical formulation used in the present invention follows; concentrations are expressed in parts by weight per hundred parts by weight polyol:

| Reactant | Concentration |
| --- | --- |
| Polyol | 100 |
| TDI Index | 80–120 |
| Plasticizer/DBNG | 20–60 |
| Water | 1–5.5 |
| Silicone Surfactant | 0.2–3 |
| Tertiary Amine Catalyst | .02–2 |
| Tertiary Amine Co-Catalyst | .02–2 |
| Auxiliary Blowing Agent | 0.5–40 |
| Tin Catalyst | .05–.5 |

Preferred concentrations for the plasticizer/DBNG mixture and water are from about 25 to about 50 and from about 1.75 to about 4.5, respectively. The weight ratio for the plasticizer/DBNG mixture is from about 20/80 to about 90/10; the ratios of 50/50 to 75/25 are preferred.

Polyether polyols which are poly(propylene oxide/ethylene oxide)triols having average molecular weights in the range from about 250 to about 6,500 and preferrably 3,500 to 6,500 can be used in the present invention. MULTRANOL 3901, 9151 and 9225 which have average molecular weights in the range of about 5,000 to 6,500, sold by Mobay Chemical Company, are polyols that can be used in the present process. Olin Chemical Company, Wyandotte Chemical Company, Union Carbide Corporation and Jefferson Chemical Company sell other suitable polyols, such as Carbide's NIAX 35-25. Additional polyols, such as glycerol, hexane triol, butane triol, trimethylol propane, trimethylol ethane and pentaerythritol, can be included in the polymerization reaction with the polyether polyol to maintain a desirable stoichiometrically balanced —NCO/—OH ratio, which should be in the range from about 1:0.8 to about 1.2:1. A suitable polyester polyol is made by Hooker Chemical Corporation and called Rucoflex F-203. This polyol is a glycol-adipate polyester resin having an average molecular weight of about 3,000.

Representative examples of polyfunctional isocyanates that can be used to make polyurethane compositions include: 2,4-toluene diisocyanate, 2,6-toluene diisocyanate, phenylene diisocyanates, ethylene diisocyanate, 1,7-naphthylene diisocyanate, 1,5-naphthylene diisocyanate, 4,4'-diphenylmethane diisocyanate (MDI), 4,4'-diphenyl diisocyanate, methylene diisocyanate, trimethylene diisocyanate, tetramethylene-1,4-diisocyanate, 1,4-butylene diisocyanate, 2,3-butylene diisocyanate, 1,4-cyclohexylene diisocyanate, polymethylene polyphenylisocyanate, mixtures and polymers thereof, and the like.

The aromatic diisocyanates are generally the least expensive and most reactive polyisocyanates available, and are therefore preferred. For certain purposes, however, aralkyl polyisocyanates, such as the polymethylene polyphenyl diisocyanates, have valuable properties which make it desirable to use them alone or in mixtures with the aromatic diisocyanates.

Conventionally, the TDI used in the subject invention contains the isomers of 2,4- and 2,6-toluene diisocyanate. The concentration of these isomers is not critical. Usually, a ratio of 80/20 TDI, preferably having an index of between about 80 to about 120, is used. Suitable TDI is sold by Mobay Chemical Company under the tradename MONDUR TD-80 and by Rubicon Chemicals, Inc. under the tradename RUBINATE TDI.

The plasticizers are halogenated phosphonate and halogenated phosphate esters. Chlorinated plasticizers are preferred, but other halogen atoms, such as bromine, can be utilized. ANTIBLAZE 78, sold by Mobil Chemical Company, is a chlorinated phosphonate ester which can be used. FYROL FR-2 and FYROL EFF sold by Stauffer Chemical Company, THERMOLIN 101 sold by Olin Chemical Company and PHOSGARD 2×C20 sold by Monsanto Chemical Company are chlorinated phosphate esters that can be used as plasticizers. FIREMASTER LV-T23P is a brominated phosphate ester sold by Velsicol Chemical Corporation.

Pure DBNG is a solid having a melting point of 110° C. FR 1138, sold by Dow Chemical Company, is a commercially available dibromoneopentyl glycol. It primarily consists of 85% dibromoneopentyl glycol, 10% tribromoneopentyl alcohol and 5% monobromonepentyl triol and has a melting point of 90°–100° C. Useful weight ratios of plasticizer to DBNG are mentioned above. The desirable and preferred concentrations for their mixture are also mentioned above. Esters of DBNG, particularly esters of organic carboxylic acids can also be utilized; one such ester is that prepared by reacting DBNG with adipic acid; XNS-50044 is such a DBNG-adipate sold by Dow Chemical Company.

The flame retardant mixture can be a solution or a dispersion. Incorporating the mixture in the form of a solution is preferred.

The concentration of water varies between about 1 to about 5.5 parts by weight, preferably between about 1.75 and about 4.5 parts by weight, of the polyol. Generally, as the water concentration in the foam formulation is increased, there is an attendant increase in the concentration of the plasticizer/DBNG mixture required to flame-proof the foam.

The remaining ingredients of a polyether foam formulation comprise a silicone surfactant, a tertiary amine catalyst and a tin catalyst. The formulation can include blends of polyether polyols, a tertiary amine co-catalyst and an auxiliary blowing agent. L-5305 and L-5307, sold by Union Carbide Corporation, are silicone surfactants that can be used in the present foam formulation; their concentration should be about 0.5 to 1 part by weight. NIAX A-1, also sold by Union Carbide Corporation, is a tertiary amine catalyst that can be included in the formulation; its concentration should be about 0.1 to 0.2 parts by weight. One part of NIAX A-1 catalyst is usually blended with two parts of polyol carrier to attain more accurate metering. NIAX A-133 is such an A-1/polyol blend. Dabco LV-33 or Dabco TL, sold by Air Products, are tertiary amine co-catalysts useful in this formulation. These cocatalysts can also be used as the sole amine catalysts. Freon 11, sold by E. I. DuPont de Nemours & Company, can be used as an auxiliary blowing agent. The tin catalyst is a conventional stannous octoate catalyst whose concentration should be about 0.1 to 0.2 parts by weight or dibutyltindilaurate catalyst whose concentration should be about 0.05 to 0.2 parts or mixtures thereof. Fomrez C-2, sold by Witco Chemical Company, and T-9 and T-12, sold by M & T Chemicals, are suitable tin catalysts. Optionally, the tin catalyst is included in the formulation by use of a carrier. The carrier can be a plasticizer or the polyol. Witco's Fomrez C-6 is such a diluted form of two parts of plasticizer blended with one part of Fomrez C-2.

The remaining ingredients of a polyester foam formulation comprise an organosilicone surfactant, tertiary amine catalysts, and auxiliary blowing agent. L-536, sold by Union Carbide Corporation, is a silicone surfactant that can be used with the polyester foam formulation; its concentration should be about 1.5 parts by weight. B-16, sold by Lonza Chemical Company, A-30, sold by Union Carbide Corporation, and NEM, sold by Jefferson Chemical Company, are tertiary amine catalysts that can be used with polyester formulations.

The use of conventional adjuvants employed in the production of polyurethanes, such as polymerization and gelation catalyst, emulsifiers, and foam stabilizers do not interfere with the present inventive process. Various antioxidants may also be incorporated into the formulation as a stabilizer.

EXAMPLES

The following examples illustrate the ease with which highly flame retardant flexible polyurethane foams may be produced from polyols and polyisocyanates, particularly toluene diisocyanate, in accordance with the present invention. In each of these examples, each component of the foam formulation is expressed in parts by weight per hundred parts by weight of polyol (php) unless otherwise indicated. Where tradenames or trademarks are used to denote a particular component of the foam formulation, those components may be identified from this list:

- A-1 (NIAX) is a tertiary amine catalyst, sold by Union Carbide Corporation, which is a 70 percent solution of bis(2-dimethlaminoethyl) ether in dipropylene glycol.
- A-30 (NIAX) is a tertiary amine catalyst, sold by Union Carbide Corporation, which contains A-1 and a silicone surfactant.
- A-133 (NIAX) is a 33 percent solution of A-1 catalyst in a dipropylene glycol and is sold by Union Carbide Corporation.
- B-16 is a tertiary amine catalyst comprising a dimethyl cetyl amine sold by Lonza Chemical Company.
- C-6 (FOMREZ) is a 1:2 blend of stannous octoate catalyst in anhydrous dioctyl phthalate (DOP) sold by Witco Chemical Company, Inc.
- C-175 (NIAX) is an aromatic primary amine catalyst dissolved in polyols and sold by Union Carbide Corporation.
- DABCO LV-33 is a 33 percent solution of triethylamine diamine in dipropylene glycol sold by Air Products and Chemicals, Inc.
- DABCO TL is a blend of a ditertiary alkanolamine and triethylene diamine in dipropylene glycol sold by Air Products and Chemicals, Inc.
- DEOA-LF is a mixture of 85 percent diethanol amine in 15 percent water sold by Union Carbide Corporation.
- DMEA (or its equivalent DMAE) is dimethylethanolamine catalyst sold by Union Carbide Corporation (and Pennwalt Corporation).
- FREON-11 is trichloromonofluoromethane blowing agent solid by E. I. duPont de Nemours Company.
- FR-1138 is a dibromoneopentyl glycol sold by Dow Chemical Company. It primarily consists of 85% dibromoneopentyl glycol, 10% tribromoneopentyl alcohol and 5% monobromoneopentyl triol and has a melting point of 90°–100° C.
- FYROL EFF is a chlorinated phosphate ester sold by Stauffer Chemical Company.
- L-5305, L-5307, L-5740 and L-536 are non-hydrolyzable silicone surfactants sold by Union Carbide Company.
- MONDUR MT-40 is a mixture of aromatic diisocyanates containing 80/20 TDI and MDI with an average free NCO content of 40 percent sold by Mobay Chemical Company.
- MONDUR TD is a 65/35 blend of the 2,4- and 2,6-TDI isomers, sold by Mobay Chemical Company.
- MULTRANOL 3901, 9151 and 9225 are high molecular weight hydroxy terminated poly (propylene oxide/ethyleneoxide) triols sold by Mobay Chemical Company; 9151 and 9225 also contain a small percentage of polyurea dispersions.
- NEM is a tertiary amine catalyst, sold by Jefferson Chemical Company, which is N-ethyl morpholine.
- NIAX 35-25 is a hydroxyl-terminated poly (oxyalkylene) polyether polyol with an average molecular weight of about 5,000 and containing a styrene-acrylonitrile copolymer sold by Union Carbide Corporation.
- OLIN POLY G 32-48 is a copolymer of ethylene oxide and propylene oxide with an average molecular weight of about 3,500 sold by Olin Chemical Company.
- RUCOFLEX F-203 is a glycol-adipate polyester resin sold by Hooker Chemical Company.
- 80/20 TDI is a toluene diisocyanate containing about 80 percent of 2,4-toluene diisocyanate and about 20 percent 2,6-toluene diisocyanate, available from Mobay Chemical Company and Rubicon Chemicals.
- THERMOLIN 101 is a chlorinated phosphate ester sold by Olin Chemical Company.
- T-9 is a stannous octoate catalyst and T-12 is a dibutyltindilaurate, sold by M&T Chemicals.
- XNS-50044 is a DBNG adipate sold by Dow Chemical Company. The monomer is made by reacting DBNG with adipic acid.

Some terminology that appears below can be identified from this list:
- CT means creamtime which is a visual indication of an extreme porosity change in the foaming system. The formulation undergoes a change from a clear liquid to an opaque, creamy system. Initiation of foam rise occurs at the creamtime.
- RT means risetime which is the point at which the foaming mass ceases to rise and is indicative of how soon the foam product may be handled.
- BD means burn distance which is the distance in inches that the foam sample actually burned.
- Flame Spread Index ($I_s$) of a foam sample is the product of the flame spread factor ($F_s$) and the heat evolution factor (Q), where $F_s$ and Q are defined in ASTM E 162-78, paragraphs 9.2 and 9.3
- Density is measured in $lb/ft^3$.
- Porosity is measured in $ft^3/min$.
- Different test procedures were used in evaluating the flame retardant nature of the foam product. Motor Vehicle Safety Standard Docket 302 (MVSS) is a horizontal flammability test in which a foam sample is horizontally displaced a certain distance above a gas flame. A burn rate of 4 inches per minute is required to pass this test. Fisher Body TM 32-12 is another horizontal flammability test, which requires a burn rate of 2.5 inches per minute or less to pass fire retardant specifications. Fisher Body TM 32-10 test requires accelerated aging of test samples prior to a flammability test and was used to prepare samples evaluated according to the Fisher Body TM 32-12 test. The TM 32-10 test is acyclic test involving dry heat, humid aging and exposure to extreme cold. The duration of this accelerated aging test is over a two-week period. The latter flammability test represents the more stringent requirements of the automotive industry.

The Radiant Panel Test (ASTM E 162-78) is the most stringent industry-accepted flammability test for polyurethane foam. A value not exceeding 125 and preferably less than 25, for the Flame Spread Index is acceptable for most applications in which highly flame retardant flexible polyurethane foams are required. The Flame Spread Index of polyurethane foams is a value indicating comparable flammability to asbestos-cementboard and red oak flooring. The median valve of at least three samples is normally reported for Flame Spread Index.

In the following examples both conventional polyether and polyester polyurethane foam slabstock are prepared; however, the vast majority of the reported experiments are directed to the preparation of high resiliency polyether polyurethane foam slabstock. These high resiliency foam materials are usually prepared from high molecular weight oxypropylene/oxyethylene polyols which have been terminated with ethylene oxide to provide a high proportion of primary hydroxyl groups. The increased reactivity of primary hydroxyls in ethylene oxide capped polyols allows a decreased level of organotin compounds for urethane catalysis and reduces the need for a high temperature oven post-cure to attain maximum properties. Compared to conventional, one-shot flexible urethane foams, these foams are characterized by higher resilience properties, greater cushioning comfort as measured by the ratio of indentation loads at 65 percent and 25 percent deflection, increased inherent resistance to flammability and lower dynamic flex fatigue.

EXAMPLE I

The following foam formulation was utilized to show the effect of a high concentration of 50/50 FYROL EFF/DBNG mixture on the physical properties of a conventional polyether foam product.

| Reactant | Concentration |
|---|---|
| Olin 32-48 | 100 |
| 80/20 TDI Index | 110 |
| 50/50 FYROL EFF/DBNG | 30 |
| Water | 4 |
| L-5740 Surfactant | 0.7 |
| A-1 Catalyst | 0.1 |
| T-9 Catalyst | 0.22 |

These reactants in the above concentrations were mixed in a conventional manner. The 50/50 FYROL EFF/DBNG mixture was included in the form of a heated solution. The reaction conditions used were conventional and well-known to those skilled in the art. Samples from the foam product were evaluated and the results appear below:

TABLE I

| Experiment 57 | |
|---|---|
| PROPERTIES | |
| CT | 10 |
| RT | 113 |
| Radiant Panel | 70 |
| Density | 2.06 |
| Porosity | .76 |

EXAMPLE II

The following foam formulation was used to show the effect of a high concentration of a 70/30 THERMOLIN 101/DBNG mixture on the physical properties of a conventional polyester foam product:

| Reactant | Concentration |
|---|---|
| Hooker F-203 | 100 |
| 80/20 TDI Index | 103 |
| 70/30 THERMOLIN 101/DBNG | 30 |
| Water | 3.7 |
| L-536 Surfactant | 2.5 |
| NEM Catalyst | 0.5 |
| B-16 Catalyst | 0.15 |
| A-30 Catalyst | 0.5 |

These reactants in the above concentrations were mixed in a conventional manner. The 70/30 THERMOLIN 101/DBNG mixture was included in the form of a solution. The reaction conditions used were conventional and well-known to those skilled in the art. Samples from the foam product were evaluated and the results appear below:

TABLE II

| Experiment 117 | |
|---|---|
| PROPERTIES | |
| CT | 10 |
| RT | 95 |
| Radiant Panel | 33 |
| Density | 2.64 |
| Porosity | .42 |

EXAMPLE III

The following foam formulation was utilized to show the effect of a high concentration of a 50/50 blend of FYROLL EFF/DBNG on the physical properties of high resiliency polyether foam products:

| Reactant | Concentration |
|---|---|
| MULTRANOL 3901 | 80 |
| MULTRANOL 9225 | 20 |
| 80/20 TDI Index | 110 |
| 50/50 FRYOL EFF/DBNG | 30 |
| Water | 2.3 |
| L-5307 Surfactant | 1.0 |
| DEOA-LF | 1.0 |
| A-1 | 0.15 |
| T-12 | 0.05 |
| DABCO LV-33 | 0.30 |

These reactants in the above concentrations were mixed in a conventional manner. The reaction conditions used were conventional and well-known to those skilled in the art. Samples from the foam product were evaluated and the results appear below:

TABLE III

| Experiments | 48 | 48A | 48B |
|---|---|---|---|
| PROPERTIES | | | |
| CT | 8 | 9 | 9 |
| RT | 121 | 132 | 141 |
| MVSS-302 BD | .35 | — | — |
| Fisher Body | .33 | — | — |
| FR Test BD | | | |
| Radiant Panel | 14 | 13 | 11 |
| UL-94 | HF-1 | — | — |
| CALIF. 117* | passed | — | — |
| Density | 3.01 | 3.35 | 3.0 |
| Porosity | 3.53 | 2.60 | 1.2 |
| 4" 25% ILD, # | 21.0 | — | — |
| 4" 65% ILD, # | 61.9 | — | — |
| Sag Factor | 2.95 | — | — |
| Resilience, % (Ball Rebound) | 50.3 | — | — |
| 50% C.S., % Loss | 23.6 | — | — |

*"Passed" means the samples passed both the California Vertical Flame Test and the California Cigarette Smoldering Test according to the Technical Information Bulletin 117.

EXAMPLE IV

The following foam formulation was utilized to show the effect of a high concentration of a 70/30 FYROL EFF/DBNG blend on the physical properties of a high resiliency polyether foam product:

| Reactant | Concentration |
|---|---|
| MULTRANOL 3901 | 80 |
| MULTRANOL 9225 | 20 |
| 80/20 TDI Index | 110 |
| 70/30 FYROL EEF/DBNG | 30 |
| Water | 2.3 |
| L-5307 Surfactant | 1.0 |
| A-1 | 0.15 |
| DABCO LV-33 | 0.30 |
| T-12 | 0.1 |
| DEOA-LF | 1.0 |

These reactants in the above concentrations were mixed in a conventional manner. The reaction conditions used were conventional and well-known to those skilled in the art. Samples from the foam product were evaluated and the results appear below:

TABLE IV

| | Experiment 58 |
|---|---|
| PROPERTIES | |
| CT | 10 |
| RT | 158 |
| MVSS-302 BD | .32 |
| Radiant Panel | 23 |
| UL-94 | HF-1 |
| Calif. 117 | Passed |
| Density | 2.94 |
| Porosity | 2.53 |
| 4" 25% ILD, # | 20.0 |
| 4" 65% ILD, # | 50.0 |
| Sag Factor | 2.5 |
| Resilience, % (Ball Rebound) | 52.3 |
| 50% C.S., % Loss | 24.2 |

EXAMPLE V

The following foam formulation was utilized to show the effects of various high concentrations of 50/50 and 70/30 blends of FYROL EEF/DBNG on the physical properties of high resiliency polyether foam products:

| Experiments | 83 | 84 | 85 | 86 | 87 | 88 | 89 | 96 |
|---|---|---|---|---|---|---|---|---|
| BLEND | | | | | | | | |
| 50/50 | | | 25 | 20 | 40 | 50 | | |
| 70/30 | | 25 | | | | | 40 | 50 | 25 |

These reactants in the above concentrations were mixed in a conventional manner. The reaction conditions used were conventional and well-known to those skilled in the art. Samples from the foam product were evaluated and the results appear below:

TABLE V

| Experiments | 83 | 84 | 85 | 86 | 87 | 88 | 89 | 96 |
|---|---|---|---|---|---|---|---|---|
| PROPERTIES | | | | | | | | |
| CT | 9 | 9 | 9 | 10 | 10 | 10 | 10 | 9 |
| RT | 123 | 117 | 123 | 142 | 146 | 148 | 156 | 137 |
| Radiant panel | 15 | 35 | 50 | 3 | 2 | 4 | 3 | 6 |
| UL-94 | HF-1 | HF-1 | HF-1 | HF-1 | HF-1 | HF-1 | HF-1 | HF-1 |
| Calif. 117 | passed | passed | passed | passed | passed | passed | passed | passed |
| Density | 2.60 | 2.60 | 2.60 | 2.60 | 2.60 | 2.60 | 2.60 | 2.79 |
| Porosity | 2.40 | 3.14 | 2.90 | 1.30 | 1.60 | 2.90 | 3.20 | 3.60 |
| 4" 25% ILD, # | 20.0 | 25.0 | 26.1 | 30.0 | 30.0 | 26.0 | 22.0 | 19.0 |
| 4" 65% ILD, # | 56.0 | 79.0 | 77.0 | 103.0 | 118.0 | 78.0 | 63.0 | 49.0 |
| Sag Factor | 2.80 | 3.20 | 2.95 | 3.43 | 3.93 | 3.00 | 2.86 | 2.58 |
| Resilience, % (Ball Rebound) | 56.6 | 51.6 | 56.3 | 45.0 | 42.3 | 45.3 | 42.3 | 53.6 |
| 50% C.S., % loss | 14.3 | 33.5 | 27.2 | 65.3 | 66.5 | 28.1 | 28.5 | 19.2 |

EXAMPLE VI

Essentially the same foam formulation as described in Example V was used in the experiments reported below to make high resiliency polyether foam products, except that various amounts of an 80/20 blend of FYROL EFF/DBNG and, in some instances, blends of 80/20 and 65/35 TDI were used:

| Experiments | 90 | 91 | 92 | 93 | 94 | 95 |
|---|---|---|---|---|---|---|
| REACTANTS | | | | | | |
| 80/20 Blend | 30 | 40 | 50 | 30 | 30 | 30 |

TABLE VI -continued

| Experiments | 90 | 91 | 92 | 93 | 94 | 95 |
|---|---|---|---|---|---|---|
| 80/20 & 65/35 TDI Index | — | — | — | 103 | 110 | 116 |
| 80/20 TDI Index | 113 | 113 | 113 | — | — | — |

These reactants in the above concentrations were mixed in a conventional manner. The reaction conditions used were conventional and well-known to those skilled in the art. Samples from the foam product were evaluated and the results appear below:

TABLE VI

| Experiments | 90 | 91 | 92 | 93 | 94 | 95 |
|---|---|---|---|---|---|---|
| PROPERTIES | | | | | | |
| CT | 10 | 10 | 10 | 10 | 10 | 10 |
| RT | 143 | 154 | 154 | 154 | 149 | 142 |
| Radiant Panel | 16 | 5 | 4 | 4 | 4 | 4 |
| UL-94 | HF-1 | HF-1 | HF-1 | HF-1 | HF-1 | HF-1 |
| Calif. 117 | passed | passed | passed | passed | passed | passed |
| Density | 2.89 | 3.00 | 3.08 | 3.80 | 3.77 | 3.76 |
| Porosity 4" 25% | 2.10 | 3.20 | 3.10 | 2.70 | 3.20 | 3.80 |
| ILD, # 4" 65% | 34.0 | 26.0 | 23.0 | 24.1 | 32.0 | 40.0 |
| ILD, # | 78.0 | 65.0 | 62.0 | 62.0 | 79.0 | 108.0 |
| Sag Factor | 2.29 | 2.50 | 2.70 | 2.57 | 2.47 | 2.70 |
| Resilience, % (Ball Rebound) | 53.0 | 46.0 | 41.3 | 53.3 | 54.6 | 53.0 |
| 50% C.S., % Loss | 15.17 | 15.83 | 17.68 | 9.04 | 9.37 | 15.93 |

EXAMPLE VII

Essentially the same foam formulation as described in Examples V and VI was used in the experiments reported below to make high resiliency polyether foam products except that various amounts of blends of FYROL EEF/DBNG and THERMOLIN 101/DBNG were used:

| Experiments | 97 | 98 | 99 | 100 | 101 | 102 | 103 | 104 |
|---|---|---|---|---|---|---|---|---|
| REACTANTS | | | | | | | | |
| 70/30 Blend 50/50 | 25 | 20 | | | | | | 25 |
| Blend 30/70 | | | 20 | | | | | |
| Blend 15/85 | | | | 25 | | | | |
| Blend 70/30 | | | | | 25 | | | |
| Thermolin 101 | | | | | | 25 | 20 | |
| 80/20 & 65/35 TDI Index | | | | | | | 110 | |
| 80/20 TDI Index | 118 | 113 | 113 | 110 | 110 | 110 | | 107 |

These reactants in the above concentrations were mixed in a conventional manner. The reaction conditions used were conventional and well-known to those skilled in the art. Samples from the foam product were evaluated and the results apear below:

TABLE VII

| Experiments | 97 | 98 | 99 | 100 | 101 | 102 | 103 | 104 |
|---|---|---|---|---|---|---|---|---|
| PROPERTIES | | | | | | | | |
| CT | 9 | 9 | 9 | 7 | 7 | 8 | 9 | 6 |
| RT | 130 | 135 | 140 | 113 | 108 | 106 | 121 | 75 |
| Radiant Panel | 9 | 28 | 64 | 40 | 52 | 10 | 11 | 10 |
| UL-94 | HF-1 | HF-1 | HF-1 | HF-1 | HF-1 | HF-1 | HF-1 | HF-1 |
| Calif. 117 | passed | passed | passed | passed | passed | passed | passed | passed |
| Density | 2.80 | 2.65 | 2.65 | 3.17 | 3.23 | 2.97 | 3.71 | 2.44 |
| Porosity 4" 25% | 3.60 | 3.80 | 3.50 | 2.44 | 1.72 | 2.39 | 1.60 | 2.80 |
| ILD, # 4" 65% | 30.5 | 23.0 | 22.0 | 29.0 | 34.0 | 28.0 | 37.0 | 10.0 |
| ILD, # | 93.0 | 58.9 | 62.0 | 107.0 | 190.0 | 76.0 | 105.0 | 34.0 |
| Sag Factor | 3.05 | 2.56 | 2.82 | 3.69 | 5.59 | 2.71 | 2.84 | 3.40 |
| Resilience, % (Ball Rebound), | 50.6 | 56.0 | 52.6 | 44.7 | 45.0 | 47.0 | 46.3 | 51.7 |
| 50% C.S., % Loss | 33.91 | 15.72 | 30.12 | 33.87 | 52.13 | 22.80 | 12.74 | 36.90 |

EXAMPLE VIII

The following foam formulations were utilized to show the effect of a high concentration of a 70/30 Thermolin 101/DBNG blend on the physical properties of high resiliency polyether foam products using 80/20 TDI and a different polymer polyol:

| Reactants | Concentrations |
|---|---|
| 3901 Polyol | 80 |
| 35-25 Polyol | 20 |
| TDI Index | 106–110 |
| 70/30 Thermolin 101/DBNG | 30–40 |
| T-12 | 0.05 |
| L-5307 | 1.0 |
| A-1 | 0.15 |
| Dabco LV33 | 0.30 |
| DEOA-LF | 1.0 |
| Water | 2.35 |

These reactants in the above concentrations were mixed in a conventional manner. The reaction conditions used were conventional and well-known to those skilled in the art. Samples from the foam products were evaluated and the results appear below:

TABLE VIII

| Experiments | 127 | 128 | 130 |
|---|---|---|---|
| CT | 8 | 8 | 8 |
| RT | 116 | 116 | 111 |
| Radiant Panel | 15 | 33 | 17 |
| UL-94 | HF-1 | HF-1 | HF-1 |
| California 117 | Passed | Passed | Passed |
| Density | 3.01 | 2.78 | 3.05 |
| Porosity | 2.30 | 2.75 | 2.70 |
| 4" 25% ILD, # | 20.0 | 16.2 | 17.0 |
| 4" 65% ILD, # | 55.0 | 46.2 | 47.0 |
| Sag Factor | 2.75 | 2.85 | 2.76 |
| Resilience, % (Ball Rebound) | 42.6 | 45.3 | 40.3 |
| 50% C.S. % Loss | 5.47 | — | 10.14 |

EXAMPLE IX

The following foam formulations were utilized to show the effect of a high concentration of a 70/30 Thermolin 101/DBNG blend on the physical properties of high resiliency polyether foam products using a mixture of aromatic polyisocyanates namely, Mondur MT-40:

| Reactants | Concentrations |
|---|---|
| 9151 Polyol | 50 |
| 3901 Polyol | 50 |
| MT-40 Index | 105 |
| 70/30 Thermolin 101/DBNG | 30-35 |
| T-12 | 0.05 |
| T-9 | 0.10 |
| L-5307 | 1.0 |
| A-1 | 0.15-0.18 |
| DMEA | 0.30 |
| DEOA-LF | 1.0 |
| Freon-11 | 10.0 |
| Water | 1.43-1.88 |

These reactants in the above concentrations were mixed in a conventional manner. The reaction conditions used were conventional and well-known to those skilled in the art. Samples from the foam products were evaluated and the results appear below:

TABLE IX

| EXPERIMENTS | 109A | 112A |
|---|---|---|
| CT | 10 | 12 |
| RT | 196 | 246 |
| Radiant Panel | 17 | 7 |
| UL-94 | HF-1 | HF-1 |
| California 117 | Passed | Passed |
| Density | 2.31 | 2.65 |
| Porosity | 2.88 | 2.78 |
| 4" 25% ILD, # | 14.5 | 14.0 |
| 4" 65% ILD, # | 43.0 | 35.5 |
| Sag Factor | 2.97 | 2.54 |
| Resilience, % (Ball Rebound) | 40.7 | 34.6 |
| 50% C.S., % Loss | 63.8 | 35.4 |

EXAMPLE X

The following foam formulations were utilized to show the effect of a high concentration of a Thermolin 101/XNS-50044 blend on the physical properties of high resiliency polyether foam products using 80/20 TDI:

| Reactants | Concentrations |
|---|---|
| 9225 Polyol | 100 |
| TDI Index | 106 |
| 70/30 Thermolin 101/XNS 50044 | 25-40 |
| T-12 | 0.10 |
| L-5307 | 0.80 |
| A-133 | 0.45 |
| DABCO TL | 0.20 |
| DEOA-LF | 0.70 |
| Water | 2.3 |

These reactants in the above concentration were mixed in a conventional manner. The reaction conditions used were conventional and well known to those skilled in the art. Samples from the foam products were evaluated and the results appear below:

TABLE X

| Experiments | 144 | 145 | 146 | 147 |
|---|---|---|---|---|
| CT | 8 | 8 | 8 | 8 |
| RT | 136 | 146 | 152 | 154 |
| Radiant Panel | 2 | 5 | 4 | 2 |
| UL-94 | HF-1 | HF-1 | HF-1 | HF-1 |
| California 117 | Passed | Passed | Passed | Passed |
| Density | 2.52 | 2.56 | 2.66 | 2.71 |
| Porosity | 2.00 | 2.40 | 2.88 | 2.70 |
| 4" 25% ILD, # | 26.0 | 26.0 | 27.0 | 27.5 |
| 4" 65% ILD, # | 63.0 | 61.5 | 66.0 | 68.0 |
| Sag Factor | 2.42 | 2.37 | 2.44 | 2.47 |
| Resilience, % (Ball Rebound) | 40.0 | 39.6 | 39.6 | 40.3 |
| 50% C.S., % Loss | 12.8 | 10.6 | 12.2 | 12.9 |

EXAMPLE XI

The foam formulation described below was used to make high resiliency polyether foam products in experimental plant runs conducted at the Curon Plant of Reeves Brothers, Inc. at Cornelius, N.C. Both runs used 25 parts of a 70/30 blend of FYROLL EFF/DBNG.

| Reactants | Concentration |
|---|---|
| 9151 POLYOL | 50 |
| 3901 POLYOL | 50 |
| 80/20 TDI Index | 108-112 |
| C-6 | 0.30 |
| T-12 | 0.10 |
| L-5305 | 0.70 |
| A-1/polyol blend | 0.45 |
| DABCO TL | 0.30 |
| DEOA-LF | 1.0 |
| Water | 2.15 |
| C-175 | 3.0 |

These reactants in the above concentration were mixed in a conventional manner. The reaction conditions used were conventional and well known to those skilled in the art. Samples from the foam product were evaluated and the results appear below:

TABLE XI

| Runs | 179 | 179A |
|---|---|---|
| PROPERTIES | | |
| Radiant Panel | 27 | 30 |
| UL-94 | HF-1 | HF-1 |
| Calif. 117 | passed | passed |
| Density | 2.74 | 2.70 |
| Porosity | 1.60 | 1.41 |
| 4" 25% ILD, # | 26.0 | 30.0 |

TABLE XI-continued

| Runs | 179 | 179A |
|---|---|---|
| 4" 65% ILD, # | 70.0 | 85.0 |
| Sag Factor | 2.69 | 2.83 |
| Resilience, % | | |
| (Ball Rebound) | 37.7 | 33.3 |
| 50% C.S., | | |
| % Loss | 20.10 | 21.00 |

EXAMPLE XII

The foam formulations described below were used to make high resiliency polyether foam products in experimental plant runs and one actual production run conducted at the Curon Plant of Reeves Brothers, Inc. at Cornelius, N.C. All runs used 25 to 30 parts of a 70/30 blend of Thermolin 101/DBNG:

| Reactants | Concentrations |
|---|---|
| 9151 Polyol | 70-100 |
| 3901 Polyol | 0-30 |
| 80/20 TDI Index | 109-115 |
| C-6 | 0-0.3 |
| T-12 | 0.08-0.14 |
| L-5305 or L-5307 | 0.70-0.80 |
| A-1 Blend or A-133 | 0.40-0.45 |
| DABCO TL | 0.20-0.30 |
| DEOA LF | 0.60-1.0 |
| Water | 1.95-2.15 |

These reactants in the above concentration were mixed in a conventional manner. The reaction conditions used were conventional and well known to those skilled in the art. Samples from the foam products were evaluated and the results appear below.

TABLE XII

| Runs | 182-1 | 182-2 | 191-3 | 209-3 | 229-1 | 230-1 | Production Run 04-226 |
|---|---|---|---|---|---|---|---|
| Radiant Panel | 12 | 18 | 7 | 6 | 13 | 11 | 11 |
| UL-94 | HF-1 | HF-1 | HF-1 | HF-1 | HF-1 | HF-1 | HF-1 |
| Calif. 117 | Passed | Passed | Passed | Passed | Passed | Passed | Passed |
| Density | 2.73 | 2.61 | 2.55 | 2.56 | 2.56 | 2.54 | 2.79 |
| Porosity | 2.25 | 1.28 | 1.35 | 1.70 | 1.55 | 1.47 | 0.94 |
| 4" 25% ILD, # | 42.0 | 48.0 | 32.0 | 29.0 | 30.0 | 32.0 | 39.0 |
| 4" 65% ILD, # | 116.0 | 136.0 | 93.0 | 74.0 | 80.0 | 81.0 | 98.0 |
| Sag Factor | 2.76 | 2.83 | 2.91 | 2.55 | 2.67 | 2.53 | 2.51 |
| Resilience, % | | | | | | | |
| (Ball Rebound) | 31.7 | 29.0 | 44.0 | 50.3 | 47.0 | 43.3 | 35.6 |
| 50% C.S., % Loss | 29.7 | 29.7 | 15.9 | 20.6 | 17.0 | 17.0 | 9.3 |

It is not intended to limit the present invention to the specific embodiments described above. Other changes may be made in the formulation or process specifically described without departing from the scope and teachings of the present invention. The present invention is intended to encompass all other embodiments, alternatives and modifications consistent with this invention.

I claim:

1. In a process for producing flexible polyether or polyester polyurethane foams having a porosity in the range from about 0.5 to about 10 cubic feet per minute, in which a polyfunctional isocyanate is reacted with a polyol in the presence of a small amount of a blowing agent and a catalytic amount of a polymerization catalyst, the improvement which comprises:

incorporating as a separate reactant into the reaction mixture prior to polymerization in excess of about 20 to about 60 percent by weight of a mixture of dibromoneopentyl glycol or its esters and flame retardant plasticizer, based on the weight of polyol used in the polymerization reaction, which manner of incorporating said mixture results in substantially more flame retardant foams without adversely affecting the physical characteristics of said foams.

2. The process for producing high resiliency flame retardant flexible polyether polyurethane foams according to claim 1, in which the polyol is a poly(propylene oxide/ethylene oxide) triol having an average molecular weight in the range from about 3,500 to about 6,500.

3. The process for producing flame retardant flexible polyurethane foams according to claim 2, in which the polyol is reacted with a sufficient amount of a mixture of toluene diisocyanate isomers.

4. The process for producing flame retardant flexible polyurethane foams according to claim 2, in which the dibromoeopentyl glycol/plasticizer mixture is incorporated in the reaction medium in the form of a solution.

5. The process for producing flame retardant flexible polyurethane foams according to claim 2, in which the dibromoneopentyl glycol/plasticizer mixture is incorporated in the form of a dispersion.

6. The process for producing flame retardant flexible polyurethane foams according to claim 2, in which from about 0.5 to about 5.5 percent by weight of water and from about 25 to about 50 percent by weight of dibromoneopentyl glycol/plasticizer mixture, based on the weight of polyol used in the polymerization reaction, are used in the reaction mixture.

7. The process for producing flame retardant flexible polyurethane foams according to claim 2, in which the weight ratio of plasticizer to dibromoneopentyl glycol is from about 20/80 to 90/10.

8. The process for producing flame retardant flexible polyurethane foams according to claim 2, in which the weight ratio of plasticizer to dibromoneopentyl glycol is from about 50/50 to 75/25.

9. The process for producing flame retardant flexible polyurethane foams according to claim 2, in which the plasticizer is a chlorinated phosphonate ester.

10. The process for producing flame retardant flexible polyurethane foams according to claim 2, in which the plasticizer is a chlorinated phosphate ester.

11. The process for producing flame retardant flexible polyurethane foams according to claim 2, in which the plasticizer is a brominated phosphate ester.

12. The process for producing flame retardant flexible polyurethane foams according to claim 2, in which the foam obtained has a Flame Spread Index according to ASTM E 162-78 of less than about 25.

13. A process for producing flexible, high resiliency, flame retardant polyether polyurethane foam having a porosity in the range from about 0.5 to about 10 cubic feet per minute, in which an isomeric mixture of 2,4- and 2,6 toluene diisocyanate is reacted with a (propylene oxide/ethylene oxide) triol having a molecular weight from about 3,500 to about 6,500 in the presence of a small amount of water and a catalytic amount of polymerization catalyst, the improvement which comprises:
  incorporating as a separate reactant into the reaction mixture prior to polymerization in excess of about 20 to about 60 percent by weight of a mixture of dibromoneopentyl glycol and flame retardant plasticizer, based on the weight of the polyol used in the polymerization reaction, which manner of incorporating said mixture results in substantially more flame retardant foam without adversely affecting the physical characteristics of said foams.

14. The process for producing flame retardant polyurethane foam according to claim 13 in which the dibromoneopentyl glycol plasticizer mixture is incorporated in the reaction mixture in the form of a solution.

15. A process for producing flame retardant polyurethane foam according to claim 13 in which the plasticizer is a chlorophosphonate ester.

16. A process for producing flame retardant polyurethane foam according to claim 13 in which the toluene diisocyanate is an 80/20 blend of the 2,4- and 2,6-isomers.

17. A process for producing flame retardant polyurethane foam according to claim 13 in which the weight ratio of plasticizer to dibromoneopentyl glycol is from about 50/50 to about 75/25.

* * * * *